United States Patent [19]
Jung

[11] Patent Number: 5,693,266
[45] Date of Patent: Dec. 2, 1997

[54] HEATING-TYPE ULTRASONIC HUMIDIFIER

[75] Inventor: Woong Jung, Kyeongki-Do, Rep. of Korea

[73] Assignee: Daewoo Electronics Co., Inc., Seoul, Rep. of Korea

[21] Appl. No.: 705,051

[22] Filed: Aug. 29, 1996

[30] Foreign Application Priority Data

Aug. 30, 1995 [KR] Rep. of Korea ............... 95-27567

[51] Int. Cl.$^6$ ............................................. B01F 3/04
[52] U.S. Cl. ......................... 261/142; 261/80; 261/81; 261/DIG. 48; 392/473
[58] Field of Search ....................... 261/DIG. 48, 81, 261/142, 80; 392/473

[56] References Cited

U.S. PATENT DOCUMENTS

| | | | |
|---|---|---|---|
| 4,031,171 | 6/1977 | Asao et al. ........................... | 261/1 |
| 4,089,915 | 5/1978 | Jackson ................................ | 261/39 |
| 4,520,864 | 6/1985 | Katagiri et al. ...................... | 261/142 |
| 4,563,313 | 1/1986 | Tsuaki ................................. | 261/DIG. 48 |
| 5,176,856 | 1/1993 | Takahashi et al. ................... | 261/142 |

FOREIGN PATENT DOCUMENTS

| | | | |
|---|---|---|---|
| 4122389 | 1/1993 | Germany ............................ | 261/DIG. 48 |
| 105140 | 5/1991 | Japan ................................... | 261/DIG. 48 |
| 0230038 | 10/1991 | Japan ................................... | 261/DIG. 48 |

Primary Examiner—Tim R. Miles
Attorney, Agent, or Firm—Foley & Lardner

[57] ABSTRACT

A humidifier reduces the noise generated by the dropping of water droplets and can also vent bacteria-destroyed mist. An auxiliary water tank is installed under a water supply tank for receiving the water supplied from the water supply tank. An ultrasonic humidifying vessel is connected to the auxiliary water tank. A heating-type humidifying apparatus is provided at the upper portion of the ultrasonic humidifying vessel. A heating coil is wound around a driving pulley of the heating-type humidifying apparatus. First and second idle pulleys are immersed in the water contained in the ultrasonic humidifying vessel. A humidifying endless belt trains around the driving, the first idle, and the second idle pulleys. The portion of the humidifying endless belt around the driving pulley is heated by the heating coil, thereby generating steam, and the portions of the humidifying endless belt around the first and second idle pulleys are immersed in the water contained in the ultrasonic humidifying vessel, so that it absorbs water. The humidifying endless belt receives the water droplets from a mist conduit tube, reducing the noise caused by the dropping of the water droplets. The air fed is introduced into the ultrasonic humidifying vessel. The bacteria in the mist are destroyed when the mist meets the hot steam generated by the heating coil or passes by the heating coil. The mist is mixed together with the steam in the mist conduit tube, and is vented.

16 Claims, 4 Drawing Sheets

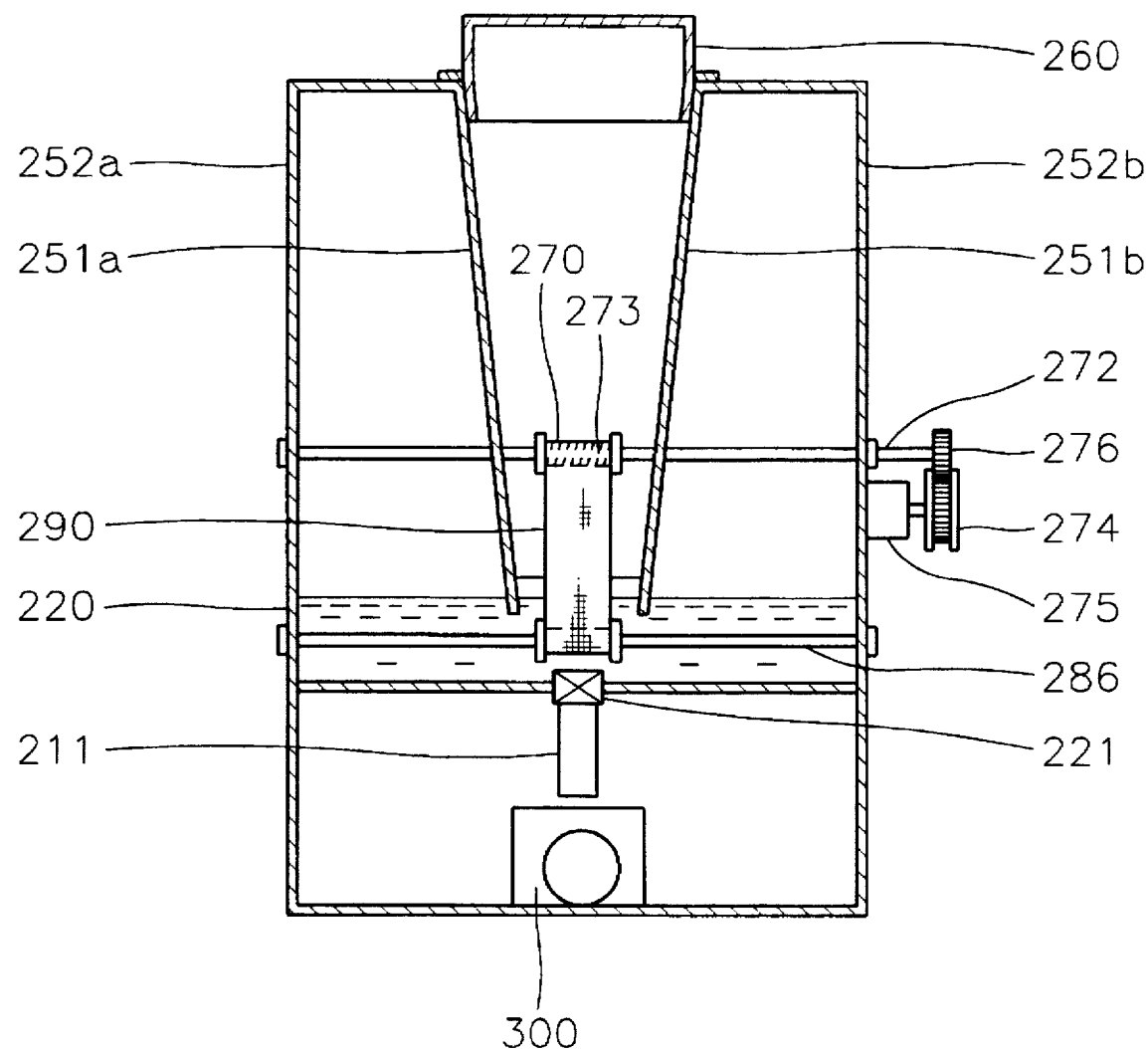

HEATING-TYPE ULTRASONIC HUMIDIFIER

BACKGROUND OF THE INVENTION

1. Field of the Invention

The present invention relates to a heating-type ultrasonic humidifier, and more particularly to a heating-type ultrasonic humidifier which can destroy bacteria contained in water by heating the water with a heater.

2. Description of the Prior Art

An atmosphere of a room, especially of a room of a concrete building such as an apartment, is dry in the winter. But, it can be harmful to a body if the air in a room remains dry for a long time. Therefore, a humidifier is used to generate moisture artificially and to supply it to a room.

Generally, there are two types of humidifiers, heating-type humidifiers and ultrasonic humidifiers. Heating-type humidifiers disperse into a room the steam generated by heating the water contained in a water vessel. On the other hand, ultrasonic humidifiers disperse into a room the mist generated by vibrating the water contained in a water vessel with an ultrasonic vibrator.

However, since heating-type humidifiers heat water by a heater in order to generate steam, they consume too much electric power. Also, in a heating-type humidifier, the heating time needed to heat water to a predetermined temperature is too long, so steam cannot be generated sufficiently for a short period of time.

An ultrasonic humidifier which overcomes the above-mentioned disadvantages is disclosed in U.S. Pat. No. 4,031,171 issued to Macoto Asao et al.

FIG. 1 is a cross-sectional view which shows the ultrasonic humidifier. Referring to FIG. 1, the ultrasonic humidifier has a rectangular-shaped upper cabinet 1 and a lower cabinet 2 arranged beneath upper cabinet 1. The bottom portion of upper cabinet 1 is open and lower cabinet 2 has a water vessel 3 which is integrally formed with lower cabinet 2 in the central portion of lower cabinet 2. Upper cabinet 1 and lower cabinet 2 are connected to each other through a chassis board 4.

A power transformer 5, a high frequency generator 6, and a motor blower 7 are fixed on chassis board 4. Motor blower 7 feeds air into a space 8 defined by the peripheral wall of water vessel 3. A level drop detector 9, which is magnetically operated, is provided at the upper portion of chassis board 4, and extends downward into the water in water vessel 3. Level drop detector 9 detects whether the level of water in water vessel 3 is below a predetermined value. Level drop detector 9 comprises a float guide 9a perpendicularly fixed to chassis board 4 and extending downward, a magnetically operated switch 9b contained in float guide 9a, and a float 9d having two bar magnets 9c embedded therein. Float 9d is engaged with float guide 9a so as to move up and down. When float 9d drops to a position below the predetermined level of water as the level of water in water vessel 3 falls down, switch 9b opens to stop the operation of frequency generator 6. When float 9d is in a position above the predetermined level, switch 9b closes to start the operation of high frequency generator 6.

A mist conduit tube 10, which is made of an ultrasonic wave isolating material such as a plastic, is fixed to chassis board 4. The upper portion of mist conduit tube 10 projects above the top surface of upper cabinet 1 through upper cabinet, and the lower portion of mist conduit tube 10 extends to near the bottom of water vessel 3 in lower cabinet 2. A nozzle 11 is mounted so as to be rotatable in all directions at the upper end of mist conduit tube 10, and an ultrasonic vibrator assembly 12 is fixed onto the lower end of mist conduit tube 10. An ultrasonic vibrator (not shown) is mounted in ultrasonic vibrator assembly 12. A plurality of holes 10a are formed on the lower peripheral portion of mist conduit tube 10. Preferably, holes 10a are formed in a position just above the standard level of water in water vessel 3. A coaxial cable 13 for feeding high frequency energy to the ultrasonic vibrator is connected between high frequency generator 6 and ultrasonic vibrator assembly 12. A water supply tank 14 is removably fixed in upper cabinet 1, and is provided with an outlet pipe 14a projecting into water vessel 3, and with a handle 14b for easily removing water supply tank 14 from upper cabinet 1.

A cap 15 having a valve mechanism is mounted to the lower end of outlet pipe 14a. The valve mechanism automatically supplies water into water vessel 3 in order to maintain the standard level determined by the lower end of cap 15. A top plate 16 covers the top portion except at the portion for separably mounting water supply tank 14. Top plate 16 is provided with a power switch 17 for keeping power transformer 5 or high frequency generator 6 operative or inoperative, and a lamp 18 which is kept lighted while power switch 17 is closed to keep power transformer 5 or high frequency generator 6 operative.

Hereinafter, the operation of above-described humidifier will be explained.

When the water level in water vessel 3 is on the standard level, when power switch 17 is closed, power transformer 5, high frequency generator 6, and motor blower 7 are in an operating state, so a high frequency electric power is fed to the ultrasonic vibrator through coaxial cable 13 from high frequency generator 6. In addition, a high frequency energy generated from the ultrasonic vibrator is fed to the water in mist conduit tube 10 to produce mist or water droplets of a diameter less than 5 microns from the water in mist conduit tube 10. As shown by an arrow in FIG. 1, the air current fed into the space 8 of water vessel 3 out of motor blower 7 advances into mist conduit tube 10 through holes 10a, and is vented through nozzle 11 into the room together with the mist.

When the water level in water vessel 3 drops due to the vaporizing of the water and, as a result, the pressure of water vessel 3 also drops, the water in water supply tank 14 is introduced into water vessel 3 through outlet pipe 14a by atmospheric pressure, so the water level recovers to the standard water level. If water supply tank 14 is removed, the water level in water vessel 3 continues to drop, so float 9d also drops to a position below the predetermined water level. In such case, switch 9b is opened to stop the operation of high frequency generator 6 and motor blower 7. At the same time, a user is automatically informed the shortage of water in water vessel 3 by the operation of a warning lamp.

When water supply tank 14 is fitted in upper cabinet 1 after it is filled with water, the water in water supply tank 14 is introduced into water vessel 3, so the water level in water vessel 3 recovers to the standard water level and switch 9b is closed again to resume the operation of the humidifier.

The above-described ultrasonic humidifier uses a high frequency generator to generate mist. As a result, a sufficient amount of mist can be generated at a low consumption of power. However, in the ultrasonic humidifier, a human being may be infected by the bacteria contained in the mist or water droplets because the mist or water droplets are generated in a bacteria-existing state where bacteria in the water vessel are not sufficiently destroyed.

U.S. Pat. No. 4,089,915 discloses a heating-type self-sterilizing humidifier. FIG. 2 is a diagrammatic view of the humidifier.

Referring to FIG. 2, an endless belt of a porous medium 110 is trained about a lower idler pulley 112 and an upper drive pulley 114. Upper drive pulley 114 is driven by motor 116. Endless belt 110, as it passes under lower idler pulley 112, is immersed in water 118 contained in lower receptacle 120. A main reservoir 122 is filled with water 124. An intermediate chamber 126 provided with insulation 28 contains a small heater 130 for heating water 127 to a temperature of 100 degree Celsius. Intermediate chamber 126 is vented by vent line and is connected to receive water 124 of main reservoir 122, which moves by gravity through a passage 134. A flow control device 136 discharges water 127 contained in intermediate chamber 126 to lower receptacle 120 when the level of water 118 in lower receptacle 120 drops to below a predetermined value. Heater 130 is connected to a power source 130, and is continually operated whenever the humidifier is energized by a humidistat H. During operation of the humidifier, a fan 140 driven by motor 142 forces steam-containing air through endless belt of a wetted porous medium 110. While belt 110 is rotated by lower idler pulley 112 and upper drive pulley 114, steam-containing air is vented into a room, so the level of water 118 in lower receptacle 120 gradually decreases. When the level of water 118 drops to below a predetermined value, flow control device 136 is operated so that water 127 contained in intermediate chamber 126 is introduced into lower receptacle 120. Flow control device 136 includes a valve 154 provided on one side of intermediate chamber 126 and a switch 137. When valve 154 is opened, a circuit is also opened by switch 137. Switch 137 is electrically connected to a fan motor 142, and stops operation of fan motor 142 when the introduction of hot water is stopped. Therefore, the evaporative cooling of belt 110 is prevented, and a bacteria-destroying condition is maintained. Belt 110 passes through lower receptacle 120 in a bacteria-destroying condition, and air containing only bacteria-destroyed steam is vented into a room.

The self-sterilizing humidifier as above is a heating-type. As above-mentioned, since steam is generated by the heating of a heater, the humidifier uses too much power and the time needed to heat water to a predetermined temperature is too long, so a sufficient amount of steam cannot be generated in a short period of time.

Further, in an ultrasonic humidifier, there exists a problem of bacteria-infection, and it takes a relatively long time to produce a sufficient amount of mist by the vibration of an ultrasonic vibrator. In addition, all the mist produced by the ultrasonic wave cannot be vented outside, as droplets form on the inner surface of a mist conduit tube. The droplets, in turn, drop into the surface of the water contained in a water vessel, and create noise.

SUMMARY OF THE INVENTION

Therefore, it is an object of the present invention to provide a humidifier which can reduce the noise generated by the dropping of water droplets and can vent bacteria-destroyed mist.

In order to achieve the object of the present invention, there is provided a heating-type humidifier comprising: a main body wherein a water supply tank is separably fixed to the upper surface thereof at one side thereof and a duct is formed along the side wall at the other side;

an auxiliary water tank installed in the main body under the bottom surface of the water supply tank, for receiving the water from the water supply tank, wherein a flow conduit extends from the bottom surface of the auxiliary water tank;

an ultrasonic humidifying vessel connected to the auxiliary water tank through the flow conduit, for receiving the water from the auxiliary water tank, wherein an ultrasonic vibrator is provided at a lower portion thereof;

a mist conduit tube formed at an upper portion of the ultrasonic humidifying vessel in the main body;

a heating-type humidifying means provided at a lower portion of the mist conduit tube, for receiving the droplets from the mist conduit tube to reduce the noise generated by the dropping of the droplets, and for humidifying by heating the water drawn from the surface of the water in the ultrasonic humidifying vessel; and a motor blower provided in the main body, for feeding air into the mist conduit tube through the duct.

The heating-type humidifying means comprises a first pulley provided in the mist conduit tube, around which a heating coil is wound, second and third pulleys provided in the water contained in the ultrasonic humidifying vessel, parallel to the first pulley, and separated from each other by a predetermined distance, and a humidifying endless belt training around the first, second, and third pulleys. Preferably, the first pulley is positioned at a lower portion in the mist conduit tube.

The first pulley is a drive pulley for driving the humidifying endless belt, and the heating-type ultrasonic humidifier further comprises a drive means for driving the drive pulley.

The auxiliary water tank is supplied with the water from the water supply tank, and the water stored in the auxiliary water tank is fed to the ultrasonic humidifying vessel. When the water level in the ultrasonic humidifying vessel reaches a predetermined level, the heating-type humidifying apparatus starts as the operation of the ultrasonic vibrator starts, and a current is applied to the heating coil of the heating-type humidifying apparatus. The heating coil heats the water absorbed in the humidifying endless belt, and generates steam. The portion of the humidifying endless belt which trains around the drive pulley is heated from the heat of the heating coil coiled around the drive pulley to generate steam, and the portions of the humidifying endless belt which passes about the first and second idler pulleys are immersed in the water contained in the ultrasonic humidifying vessel to absorb water. The air blown out of the motor blower is introduced into the ultrasonic humidifying vessel through the duct. The bacteria contained in the mist generated by the vibration of the ultrasonic vibrator is destroyed when the mist meets the hot steam generated by the heating coil or passes by the heating coil. The mist generated by the vibration of the ultrasonic vibrator and the steam generated by the heating coil are mixed in the mist conduit tube, and then is vented into a room.

In case the operation of the ultrasonic vibrator is stopped or the current applied to the heating coil is shut off, the humidifier can be used as either a heating-type humidifier or an ultrasonic humidifier alone.

BRIEF DESCRIPTION OF THE DRAWINGS

The above objects and other advantages of the present invention will become more apparent by describing in detail a preferred embodiment thereof with reference to the attached drawings, in which:

FIG. 4 is a sectional view taken along the line A-A' in FIG. 3 of the heating-type humidifying apparatus of the humidifier of FIG. 3.

DETAILED DESCRIPTION OF THE PREFERRED EMBODIMENT

Hereinafter, a preferred embodiment of the present invention will be described in detail with reference to the accompanying drawings.

Figure 1:
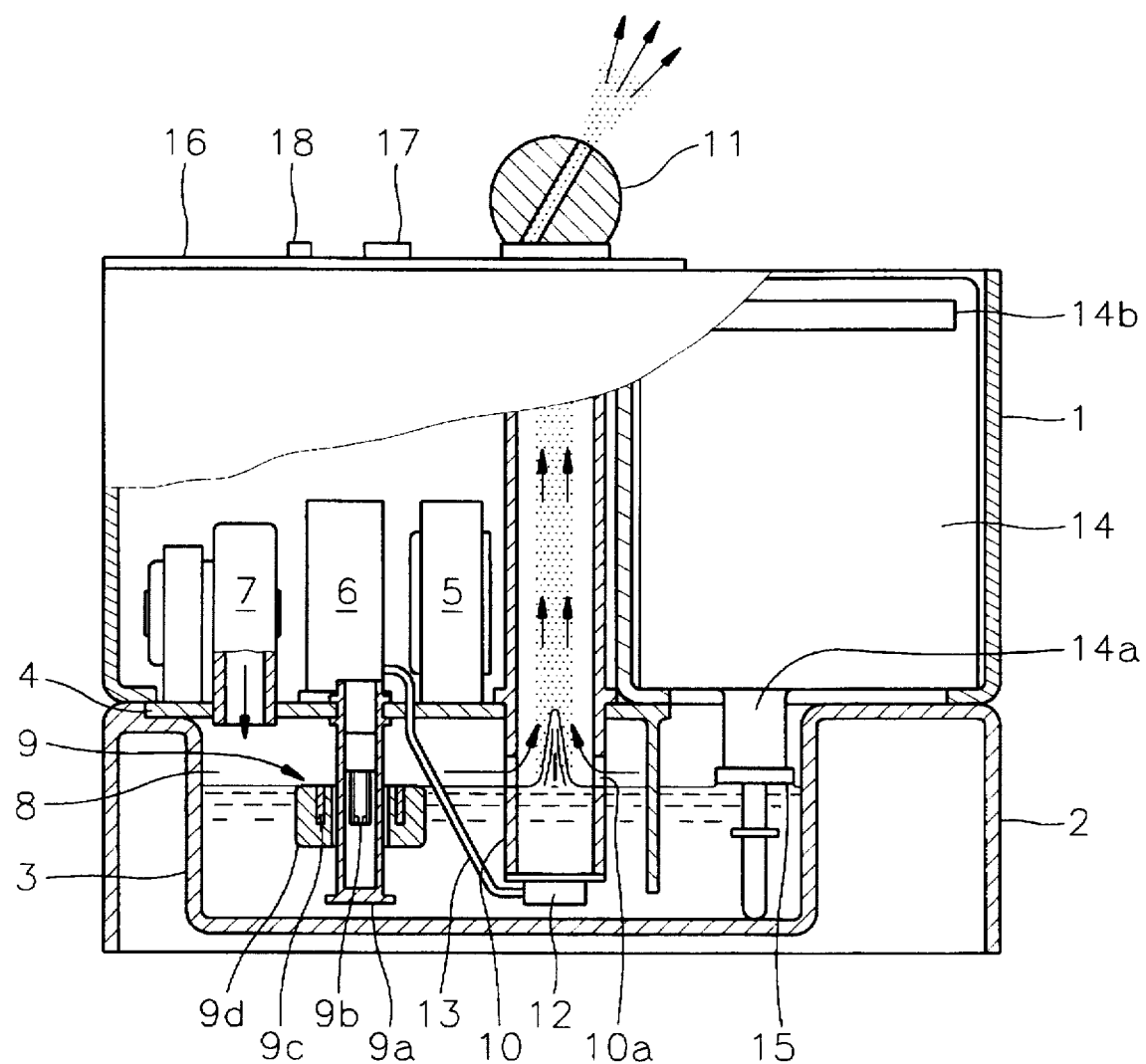
FIG. 1 is a cross sectional view of a conventional ultrasonic humidifier.
Figure 2:
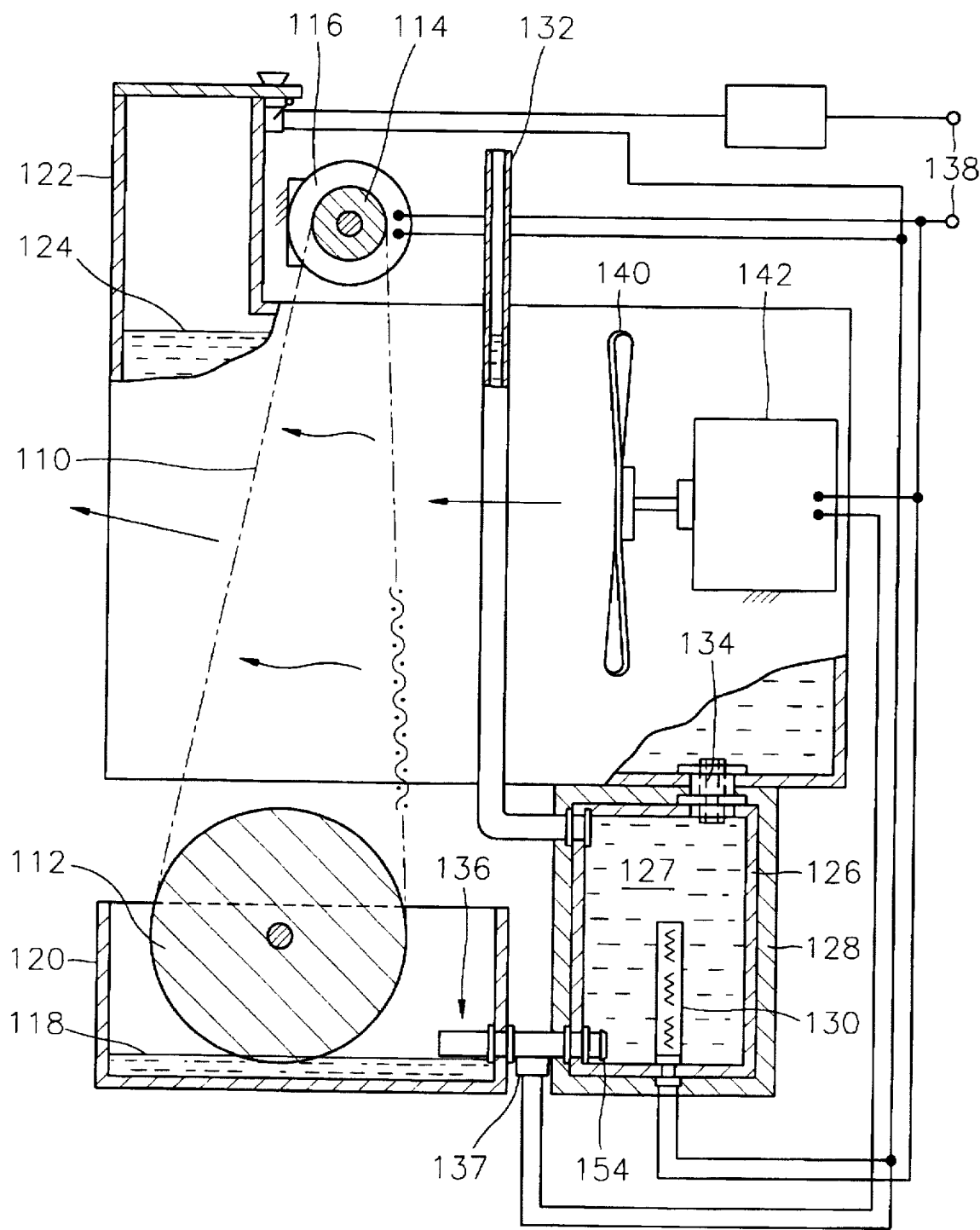
FIG. 2 is a perspective view of a conventional self-sterilizing heating-type humidifier.
Figure 3:
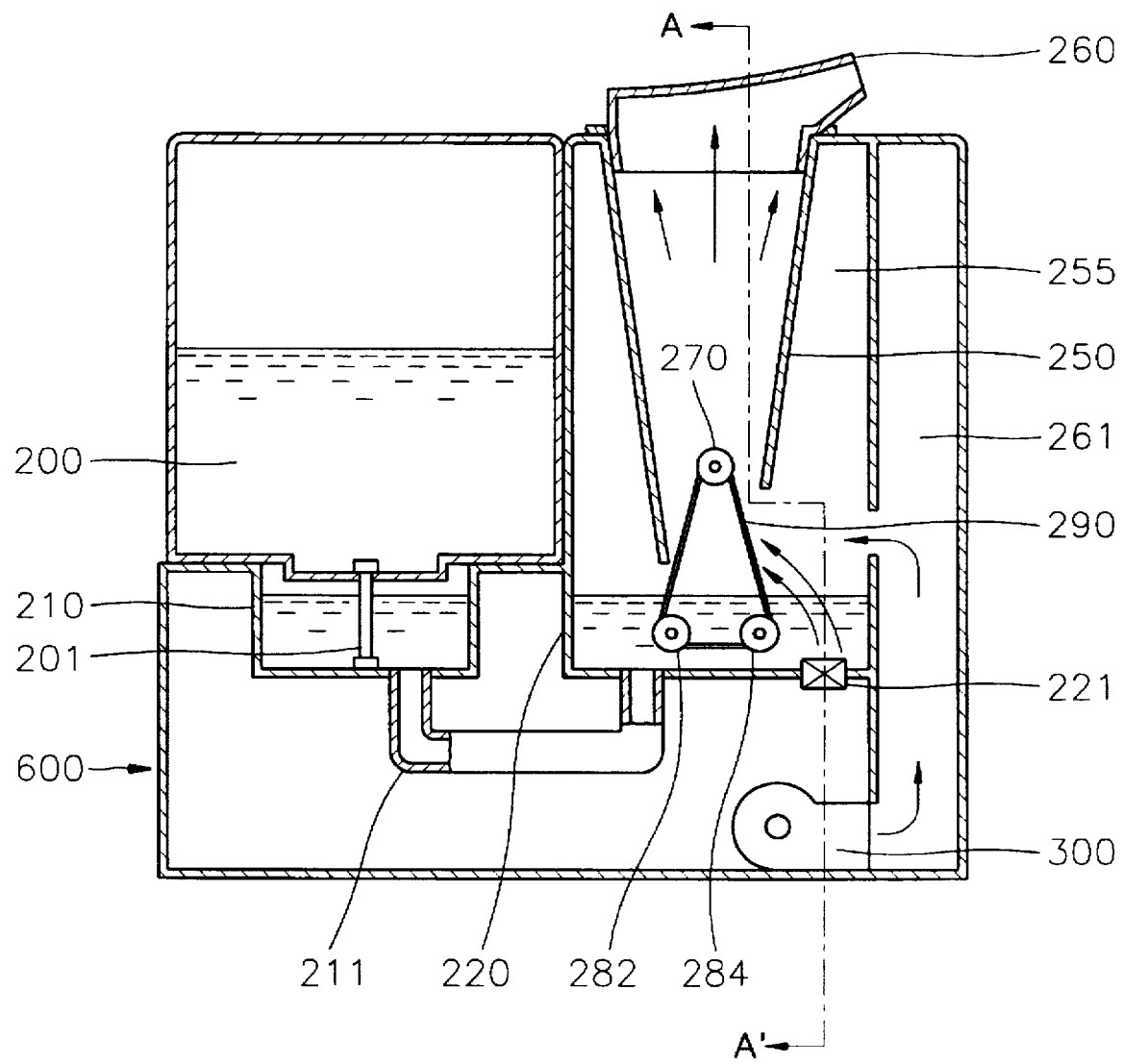
FIG. 3 is a diagrammatical cross sectional view for showing a heating-type ultrasonic humidifier according to an embodiment of the present invention.

FIG. 3 is a schematic cross sectional view for showing a heating-type ultrasonic humidifier 500 according to an embodiment of the present invention. FIG. 4 is a sectional view taken along the line A—A in FIG. 3 of the heating-type humidifying apparatus of the humidifier of FIG. 3.

With reference to FIG. 3, heating-type ultrasonic humidifier 500 has a main body 600 and a water supply tank 200 is separably fixed to the upper surface at one side of main body 600. On the other side of main body 600, main body 600 extends upward so that the upper surface of main body 600 is level with the upper surface of water supply tank 200, and so that an mist chamber 255 of an ultrasonic humidifying vessel 220 is formed. A vertical duct 261 for feeding air into mist chamber 255 is formed along the side wall on one side of main body next to mist chamber 255, and extends from the bottom surface of main body 600 to the upper surface of main body. An opening is formed on one side of duct 261 at a level higher than the water level in ultrasonic humidifying vessel 220 so that duct 261 communicates with mist chamber 255.

A valve 201 is vertically mounted at the bottom surface of water supply tank 200 to drain a predetermined amount of water. An auxiliary water tank 210 is installed in main body 600 under the bottom surface of water supply tank 200, for receiving the water supplied through valve 201 from water supply tank 200. A water flow conduit 211 extends from the bottom surface of auxiliary water tank 210 to the bottom surface of ultrasonic humidifying vessel 220, so that the water in auxiliary water tank 210 can flow into ultrasonic humidifying vessel 220 through duct 211.

An ultrasonic vibrator 221 is fixed to a bottom surface portion of ultrasonic humidifying vessel 220. A float (not shown) for detecting the water level in ultrasonic humidifying vessel 220 is positioned in ultrasonic humidifying vessel 220. The float is connected to ultrasonic vibrator 221 through a control unit (not shown). The float stops the operation of ultrasonic vibrator 221 when the water level in ultrasonic humidifying vessel 220 is below a predetermined level, and resumes the operation when the water level is above the predetermined level. Ultrasonic vibrator 221, which is supplied with electric power from a power source, vibrates the water in ultrasonic humidifying vessel 220, generates mist at the surface of the water, and feeds the mist into mist chamber 255.

A motor blower 300 is provided at a lower portion of main body 600 under ultrasonic humidifying vessel 220. Motor blower 300 feeds air from the exterior of main body 600 into ultrasonic humidifying vessel 220 through duct 261. A mist conduit tube 250 is formed in the interior of mist chamber 255 at the upper portion of ultrasonic humidifying vessel 220, which has a rectangular-shaped longitudinal section and has a tapered cross section where its lower portion is narrower than its upper portion. A nozzle 260 is rotatably mounted at the upper portion of mist conduit tube 250. The air blown out of motor blower 300 is fed into mist chamber 255 through duct 261, and forces the mist generated from the water in ultrasonic humidifying vessel 220 to be vented into a room. The direction of the mist vented from mist conduit tube 250 can be changed by nozzle 260.

A heating-type humidifying apparatus is provided at a lower portion of mist conduit tube 250, both for receiving the droplets dropping along the inner surface of mist conduit tube 250 to reduce the noise from the droplets, and for heating into the mist the water drawn from the surface of the water in ultrasonic humidifying vessel 220. The heating-type humidifying apparatus includes a driving pulley 270, a first idle pulley 282, and a second idle pulley 284. With reference to FIG. 4, a heating coil 273 wound around driving pulley 270 generates heat when a current is applied to it. Driving pulley 270 is positioned at a lower portion of mist conduit tube 250. The axis of driving pulley 270 penetrates mist conduit tube 250 at opposite side walls 251a and 251b, and is rotatably fixed to opposite side walls 252a and 252b of main body 600. One end of the axis 272 projects toward the exterior of main body 600, penetrating one side wall 252b of main body 600, and a driven gear 276 is fixed to this end. A driving gear 274 is engaged with driven gear 276, and is fixed to the shaft of driving motor 275 mounted on the side wall 252b of main body 600. Heating coil 273 is connected to the control unit (not shown) of the humidifier through a wire fixed to axis 272. Cylindrical rings are fixed to both ends of driving pulley 270.

First and second idle pulleys 282 and 284 are positioned in the water contained in ultrasonic humidifying vessel 220, and are parallel to driving pulley 270. First and second idle pulleys 282 and 284 are fixed to main body 600 at the same level. With reference to FIG. 4, both the axis 286 of first idle pulley 282 and the axis (not shown) of second idle pulley 284 are fixed to side walls 252a and 252b of main body 600. As in driving pulley 270, cylindrical rings are fixed to both ends of first and second idle pulleys 282 and 284, respectively.

A humidifying endless belt 290 trains around driving pulley 270, first idle pulley 282, and second idle pulley 284. When the axis of driving motor 275 rotates, the rotational force is transferred to driven pulley 276 through driving pulley 274. As driven pulley 276 rotates, the axis 272 of driving pulley 270 also rotates. As driving pulley 270 rotates, humidifying endless belt 290 circulates about driving pulley 270, first idle pulley 282, and second idle pulley 284.

In the preferred embodiment of the present invention, driving pulley 270 is positioned in mist conduit tube 250 at a lower portion of mist conduit tube 250. However, driving pulley 270 can be positioned in the position of either first idle pulley 282 or second idle pulley 284. In such case, one of idle pulleys 282 and 284 should be positioned in mist conduit tube 250 at a lower portion of mist conduit tube 250, and should be coiled with heating coil 273 around it.

As shown in FIG. 4, the bottom ends of the side walls of mist conduit tube 250 extends to under the surface of the water contained in ultrasonic humidifying vessel 220, and is immersed in the water. In FIG. 3, however, while an opening is formed in a first side wall of mist conduit tube 250 nearer to duct 261 so that air is introduced from duct 261, a second side wall opposite to the first side wall is formed so that its lower end almost makes contact with humidifying endless belt 290. The above-mentioned structure of mist conduit tube 250 causes the droplets formed on the inner surface of the side walls 251a and 251b of mist conduit tube 250 perpendicular to driving pulley 270 to slide down the side walls 251a and 251b, and also causes the droplets formed on the inner surface of the first and second side walls to slide down along the first and second side walls, thus being absorbed by humidifying endless belt 290. In order to allow humidifying endless belt 290 to receive the droplets formed on the inner surfaces of the first and second side walls, it is preferable that the distance between first idle pulley 282 and second idle pulley 284 is equal to or greater than the horizontal distance between the bottom ends of the first and second side walls. Therefore, the heating-type humidifier of the present invention prevents the noise which is generated when droplets formed during the ultrasonic humidifying process on the inner surfaces of the side walls of mist conduit tube 250 drop into the water contained in ultrasonic humidifying vessel 220 without humidifying endless belt 290, and also prevents a lowering of humidification efficiency. Further, since the first and second side walls are formed above the surface of the water contained in ultrasonic humidifying vessel 220, the heating-type humidifying apparatus can be installed easily.

It is preferable that humidifying endless belt 290 is made of a hygroscopic material such as fabric or the like in order to facilitate the absorption of water.

Hereinafter, the operation of the heating-type ultrasonic humidifier of the present invention will be explained.

The humidifier according to one embodiment of the present invention can be used as either a heating-type humidifier or an ultrasonic humidifier, as well as a heating-type ultrasonic humidifier.

The humidifying operation of the humidifier which accomplishes the functions of both a heating-type and an ultrasonic humidifier is as follows. Auxiliary water tank 210 is supplied with an amount of water from water supply tank 200 through valve 201. The water stored in auxiliary water tank 210 is fed to ultrasonic humidifying vessel 220. When the water level in ultrasonic humidifying vessel 220 reaches a predetermined level, a float detects this fact, and then starts the operation of ultrasonic vibrator 221 and driving motor 274 through a control unit, which applies current to heating coil 273 wound around driving pulley 270. Ultrasonic vibrator 221 generates mist from the water contained in ultrasonic humidifying vessel 220. At the same time, heating coil 273 heats the water absorbed in humidifying endless belt 290, and steam is generated. The portion of humidifying endless belt 290 which winds about driving pulley 270 is heated from the heat of heating coil 273 wound around driving pulley 270 to generate steam, and the portions of humidifying endless belt 290 which trains about first and second idle pulleys 282 and 284 are immersed in the water contained in ultrasonic humidifying vessel 220 to absorb water. The air blown out of motor blower 300 is fed into mist chamber 255 through duct 261. The bacteria contained in the mist generated by the vibration of ultrasonic vibrator 221 is destroyed when the mist meets the hot steam generated by heating coil 273 or passes nearby the heating coil 273. The mist generated by the vibration of ultrasonic vibrator 221 and the steam generated by heating coil 273 are mixed together in mist conduit tube 250, and then is vented into a room through nozzle 260.

In case the operation of ultrasonic vibrator 221 is stopped or the current applied to heating coil 273 is shut off, the humidifier can be used as either a heating-type humidifier or an ultrasonic humidifier.

In the humidifier of the present invention, since the droplets formed on the inner surface of the mist chamber drop onto the humidifying endless belt, the noise generated by the dropping of the droplets is reduced. Further, since the heating coil is positioned at a lower portion of the mist chamber, the bacteria contained in the mist generated by the ultrasonic humidification are destroyed when the mist passes by the heating coil. The humidifying endless belt circulates continuously around the heating coil applied with a current during humidification, so a heating-type humidification can also be accomplished.

By shutting off the current applied to the heating coil or stopping the operation of the ultrasonic vibrator, the humidifier can be used as either a heating-type humidifier or an ultrasonic humidifier.

While the present invention has been particularly shown and described with reference to a particular embodiment thereof, it will be understood by those destroyed in the art that various changes in form and details may be effected therein without departing from the spirit and scope of the invention as defined by the appended claims.

What is claimed is:

1. A heating-type ultrasonic humidifier comprising:
   a main body wherein a water supply tank is separably fixed to the upper surface thereof at a first side thereof and a duct is formed along a side wall at a second side opposite to the first side;
   an auxiliary water tank installed in said main body under a bottom surface of the water supply tank, for receiving a water from the water supply tank, wherein a conduit extends from the bottom surface of the auxiliary water tank;
   an ultrasonic humidifying vessel connected to said auxiliary water tank through the conduit, for receiving the water from said auxiliary water tank, wherein an ultrasonic vibrator is provided at a lower portion thereof;
   a mist conduit tube formed at an upper portion of said ultrasonic humidifying vessel in said main body;
   a heating-type humidifying means provided at a lower portion of said mist conduit tube, for receiving the droplets from said mist conduit tube to reduce the noise generated by the dropping of the droplets, and for humidifying by heating the water drawn from the surface of the water in said ultrasonic humidifying vessel; and
   a motor blower provided in said main body, for feeding air to said mist conduit tube through the duct.

2. A heating-type ultrasonic humidifier according to claim 1, wherein said heating-type humidifying means comprises a first pulley provided in said mist conduit tube, around which a heating coil is wound, second and third pulleys provided in the water contained in said ultrasonic humidifying vessel, parallel to the first pulley, and separated from each other by a predetermined distance, a humidifying endless training around the first, second, and third pulleys.

3. A heating-type ultrasonic humidifier according to claim 2, wherein the first pulley is positioned in said mist conduit tube at a lower portion of said mist conduit tube.

4. A heating-type ultrasonic humidifier according to claim 2, wherein the first pulley is a driving pulley for driving the humidifying endless belt, and the heating-type ultrasonic humidifier further comprises a driving means for driving the driving pulley.

5. A heating-type ultrasonic humidifier according to claim 2, wherein the humidifying endless belt is comprised of a hygroscopic fabric.

6. A heating-type ultrasonic humidifier according to claim 2, wherein said mist conduit tube has a rectangular-shaped longitudinal section and a tapered cross section where its lower end is narrower than its upper end.

7. A heating-type ultrasonic humidifier according to claim 2, wherein the distance between the second pulley and the third pulley is equal to or greater than a width between ends of said mist conduit tube.

8. A heating-type ultrasonic humidifier according to claim 1, said heating-type ultrasonic humidifier further comprising a nozzle rotatably mounted at the upper end of said mist conduit tube so that the direction of the mist vented from said mist conduit tube can be regulated.

9. A heating-type ultrasonic humidifier according to claim 1, wherein said motor blower is mounted on a bottom of said main body under said ultrasonic humidifying vessel.

10. A heating-type ultrasonic humidifier comprising:

a main body wherein a water supply tank is separably fixed to the upper surface thereof at a first side thereof and a duct is formed along a side wall at a second side opposite to the first side;

an auxiliary water tank installed in said main body under the water supply tank, for receiving the water from the water supply tank, wherein a conduit is formed at a lower end of said auxiliary water tank;

an ultrasonic humidifying vessel connected to said auxiliary water tank through the conduit, for receiving a water from said auxiliary water tank, wherein an ultrasonic vibrator is provided at a lower portion thereof;

a mist conduit tube formed at an upper portion of said ultrasonic humidifying vessel in said main body;

a heating-type humidifying means provided at a lower portion of said mist conduit tube, which comprises a driving pulley in said mist conduit tube, around which a heating coil is wound, first and second pulleys in the water contained in said ultrasonic humidifying vessel, parallel to the driving pulley and separated from each other by a predetermined distance, and a humidifying endless belt training around the driving pulley, the first idle pulley, and the second idle pulley, for receiving the droplets from said mist conduit tube to reduce the noise generated by the dropping of the droplets, and for humidifying by heating the water drawn from the surface of the water in said ultrasonic humidifying vessel;

a drive means for driving the driving pulley; and a motor blower provided in said main body, for feeding air to said mist conduit tube through the duct.

11. A heating-type ultrasonic humidifier according to claim 10, wherein the driving pulley is positioned in said mist conduit tube at a lower portion of said mist conduit tube.

12. A heating-type ultrasonic humidifier according to claim 10, wherein the humidifying endless belt comprises a hygroscopic fabric.

13. A heating-type ultrasonic humidifier according to claim 10, wherein said mist conduit tube has a rectangular-shaped longitudinal section and a tapered cross section where its lower end is narrower than its upper end.

14. A heating-type ultrasonic humidifier according to claim 10, wherein the distance between the first idle pulley and the second idle pulley is equal to or greater than the width of the bottom ends of said mist conduit tube.

15. A heating-type ultrasonic humidifier according to claim 10, the heating-type ultrasonic humidifier further comprising a nozzle rotatably mounted at the upper end of said mist conduit tube so that the direction of the mist vented from said mist conduit tube can be regulated.

16. A heating-type ultrasonic humidifier according to claim 10, wherein said motor blower is mounted on the bottom surface of said main body under said ultrasonic humidifying vessel.

* * * * *